US012061452B2

(12) United States Patent
Galvez et al.

(10) Patent No.: US 12,061,452 B2
(45) Date of Patent: Aug. 13, 2024

(54) BUILDING MANAGEMENT SYSTEM WITH BLOCKCHAIN LEDGER

(71) Applicant: Sensormatic Electronics, LLC, Boca Raton, FL (US)

(72) Inventors: Miguel Galvez, Plaistow, NH (US); Walter A. Martin, Ballymena (GB); Danny Hyun, Irvine, CA (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

(21) Appl. No.: 16/111,998

(22) Filed: Aug. 24, 2018

(65) Prior Publication Data

US 2020/0064796 A1    Feb. 27, 2020

(51) Int. Cl.
| | |
|---|---|
| *G05B 19/042* | (2006.01) |
| *E06B 9/24* | (2006.01) |
| *F24F 11/63* | (2018.01) |
| *H05B 47/10* | (2020.01) |

(52) U.S. Cl.
CPC .............. *G05B 19/042* (2013.01); *E06B 9/24* (2013.01); *E06B 2009/2417* (2013.01); *F24F 11/63* (2018.01); *G05B 2219/2614* (2013.01); *H05B 47/10* (2020.01)

(58) Field of Classification Search
CPC .......... G05B 19/042; G05B 2219/2614; G05B 2219/2638; G05B 2219/2648; F24F 11/63; F24F 3/06; F24F 3/065; F24F 3/08; F24F 3/10; F24F 11/00; F24F 11/30; F24F 11/32; F24F 11/37; F24F 11/39

See application file for complete search history.

(56) References Cited

U.S. PATENT DOCUMENTS

| | | | |
|---|---|---|---|
| 10,116,513 B1 | 10/2018 | Sundaram | |
| 10,325,428 B1* | 6/2019 | Kurian | ............... G07C 9/00571 |
| 10,887,107 B1* | 1/2021 | Chan | ..................... H04L 9/3271 |
| 2014/0316561 A1 | 10/2014 | Tkachenko et al. | |

(Continued)

FOREIGN PATENT DOCUMENTS

WO    WO-2019216942 A1 *  11/2019  ............. G05B 15/02

*Primary Examiner* — Robert E Fennema
*Assistant Examiner* — Vi N Tran
(74) *Attorney, Agent, or Firm* — ArentFox Schiff LLP (57) ABSTRACT

A distributed transaction ledger (e.g. a blockchain) is used to track and validate changes in a building management system such as a building automation system, access control system, or security/surveillance system. The building management system 100 includes a series of distributed devices connected to a peer-to-peer validation network. The distributed devices generate transaction information during normal operation and broadcast the transaction information to the validation network. The validation network maintains a distributed transaction ledger for the building management system, for example, by validating the transaction information and distributing the transaction information across the validation network according to consensus criteria to be stored locally in multiple instances by nodes of the validation network, which can be dedicated computing devices and/or validator distributed devices. The distributed devices perform building management functions based on validated transaction information retrieved from the transaction ledger.

26 Claims, 9 Drawing Sheets

(56) References Cited

U.S. PATENT DOCUMENTS

| | | |
|---|---|---|
| 2016/0123620 A1 | 5/2016 | Orsini et al. |
| 2016/0327294 A1* | 11/2016 | Svendsen ............ G05D 23/1902 |
| 2017/0018167 A1* | 1/2017 | Dey ..................... G08B 25/008 |
| 2017/0099157 A1 | 4/2017 | Jacobson et al. |
| 2017/0103468 A1* | 4/2017 | Orsini .................... G06Q 40/12 |
| 2017/0195336 A1* | 7/2017 | Ouellette ................. G07C 9/27 |
| 2018/0076955 A1* | 3/2018 | Shields ................... H04L 63/06 |
| 2018/0102007 A1 | 4/2018 | Trani |
| 2018/0121662 A1* | 5/2018 | Pelton ................... G06F 21/606 |
| 2018/0167394 A1* | 6/2018 | High ...................... H04L 63/123 |
| 2018/0197172 A1* | 7/2018 | Coburn ................. A63F 13/792 |
| 2018/0240101 A1* | 8/2018 | Chan ................. G06Q 20/3224 |
| 2018/0285837 A1 | 10/2018 | Wu |
| 2018/0287780 A1* | 10/2018 | Safford ................ G06F 21/575 |
| 2018/0328612 A1* | 11/2018 | Sinha ....................... F24F 11/30 |
| 2018/0332065 A1 | 11/2018 | Gupta et al. |
| 2019/0012637 A1 | 1/2019 | Gillen |
| 2019/0020648 A1* | 1/2019 | Haque ................... H04L 63/108 |
| 2019/0036906 A1* | 1/2019 | Biyani ................. H04L 9/3247 |
| 2019/0268162 A1 | 8/2019 | Sahagun et al. |
| 2019/0287146 A1* | 9/2019 | Maitland ................ H04L 41/12 |
| 2019/0342095 A1* | 11/2019 | Simons ............. B60W 30/1819 |
| 2019/0361917 A1* | 11/2019 | Tran ....................... H04W 12/108 |
| 2019/0373472 A1 | 12/2019 | Smith et al. |
| 2019/0378142 A1 | 12/2019 | Darnell et al. |
| 2020/0059365 A1 | 2/2020 | Hyland |
| 2020/0106610 A1 | 4/2020 | Doddavula et al. |
| 2020/0195442 A1 | 6/2020 | Wright et al. |
| 2020/0234386 A1 | 7/2020 | Blackman et al. |
| 2020/0287719 A1 | 9/2020 | Hildebrand et al. |
| 2021/0264527 A1* | 8/2021 | Bryant ...................... H04L 9/32 |

* cited by examiner

BUILDING MANAGEMENT SYSTEM WITH BLOCKCHAIN LEDGER

RELATED APPLICATIONS

This application is related to U.S. application Ser. No. 16/112,041, filed on Aug. 24, 2018, entitled "Access Control System Using Blockchain Ledger," and U.S. Ser. No. 16/112,030, filed on Aug. 24, 2018, entitled "Event Engine for Building Management System using Distributed Devices and Blockchain Ledger," both of which are incorporated herein by reference in their entirety.

BACKGROUND OF THE INVENTION

Building management systems such as building automation systems, security systems and access control systems are often installed within premises such as commercial, residential, or governmental buildings. Examples of these buildings include offices, hospitals, warehouses, public infrastructure buildings including subways and bus terminals, multi-unit dwellings, schools or universities, shopping malls, government offices, and casinos.

In general, building management systems include distributed devices positioned throughout the building, including one or more control panels or controllers connected to and controlling other distributed devices.

Building automation systems will typically include one or more building automation control panels and distributed devices that control and monitor the physical plant aspects of a building and aspects of business-specific electrical, computer, and mechanical systems. The physical plant typically includes heating, ventilation, and air conditioning (HVAC) systems, elevators/escalators, lighting and power systems, refrigeration and coolant systems, and air and/or water purification systems, in examples. HVAC systems typically include air handlers and systems of ducts and vents for circulating air throughout the building. Business-specific systems include computer systems, manufacturing systems that include various types of computer-aided machinery and test equipment, and inventory control and tracking systems, in examples. Sensors for building automation systems include, for example, temperature sensors, light sensors, humidity sensors, volatile organic compound (VOC) sensors. User interface elements for building automation systems might include touchscreen displays (for example, as part of a thermostat or other indicator). Actuators for building automation systems include dampers, chillers, smart lighting systems, motorized window shades, projectors and projector screens, and other mechanical equipment, to list a few examples.

Security systems typically include intrusion control panels and their own distributed devices. The distributed devices detect indications of intrusions, building security breaches and unauthorized access at or within the building and report to the intrusion panels. Security distributed devices include sensors such as motion sensors, door and window relays, thermal sensors, and surveillance cameras that communicate with the intrusion panel over a security network. Motion sensor devices can detect intrusions and unauthorized access to the premises, and send indications of the intrusions to the security panel. The surveillance camera devices capture video data of monitored areas within the premises, in examples.

Access control systems typically include control panels such as system controllers and door controllers, and distributed devices, including door position sensors, access control readers, and actuators like electric door locks, to list a few examples. The access control readers are often installed at access points of the buildings to control access to restricted areas, such as buildings or areas of the buildings. Examples of access points include front and interior doors of a building, elevators, hallways connecting two areas of a building. The access control readers read the information of keycards and/or transmitted from mobile computing devices and then the access control systems determine if the individuals are authorized to access the restricted areas. If the individuals are authorized to enter the restricted areas, then the access control readers allow access to the restricted areas by unlocking locked doors, signaling that doors should be unlocked, and activating elevators. Alarms can be generated upon unauthorized entry.

At the same time, distributed ledgers are decentralized data storage systems in which multiple instances of the same data are stored as local ledger copies on nodes of a peer to peer network. The distributed ledger indicates information through a series of transactions, which are validated by the nodes, for example, by confirming that the transactions are compatible with the transaction history indicated by the local ledger copy. Validated transactions are propagated across the network as new ledger entries, and the local ledger copies are synchronized according to consensus algorithms that determine an authoritative version of the ledger based on consensus criteria, which can include which nodes were first to solve a cryptographic puzzle, a chance selection weighted such that nodes representing entities with more ownership stake in the ledger have a higher chance of selection, voting systems, among other examples. One type of distributed ledger is a blockchain. In a blockchain, the transactions are organized into blocks, which are then validated and propagated across the peer to peer network. Along with the transaction information, each block contains a cryptographic hash of the full contents of the previous block, forming chains of linked blocks that can be traced back to the original block of the blockchain. Blockchains prevent alteration of any of the blocks, as any change to a block would require changes to the cryptographic hashes contained in every subsequent block.

SUMMARY OF THE INVENTION

A distributed ledger architecture such as a blockchain can be used to track and validate changes in a building management system such as a building automation system, access control system, or security system. The building management system includes distributed devices including controllers, sensors, actuators, and/or user interface elements, among other examples. These distributed devices generate transactions during a normal course of business and broadcast transaction information to a validation network maintaining a distributed transaction ledger.

The validation network includes validation nodes, such as computing devices connected to the building management system via a public and/or private network or validator distributed devices, which are distributed devices of the building management system that both perform building management functions and store and maintain local copies of the transaction ledger. The validation network, via the validation nodes and/or the validator distributed devices, validate the transactions, for example, by confirming the authenticity of the transactions based on cryptographic information or confirming that the distributed devices generating the transactions, and the transactions themselves, are authorized. The validation network generates new ledger entries (e.g. as new blocks of a blockchain). The ledger entries are then distributed across the validation network according to predetermined consensus criteria.

The distributed devices of the building management system then retrieve transaction information (e.g. transactions from a certain time period, instructions intended for distributed devices making the request, and/or configuration information) from the ledger and perform building management functions based on the retrieved transaction information.

In one example, a building automation system employs various smart space controllers (e.g. thermostats, blinds units, controllers, occupancy sensors, etc.) that are each capable of writing a new record on the distributed ledger. Every time the space controllers are adjusted either manually or automatically, a new record is added to the distributed ledger. Such a system is capable of maintaining a validated system history. Any component in the system that uses the historical record to determine its future operation can simply request a validated copy of this history from the ledger for a particular historical period. It can use that data to determine how it should behave in the future.

In general, according to one aspect, the invention features a method of operation of a building management system in which distributed devices perform automation functions of the building management system and generate transaction information, and a validation network receives the transaction information, generates new ledger entries for a transaction ledger based on the transaction information, and distributes the new ledger entries.

In embodiments, the distributed transaction ledger is a blockchain. Nodes of the validation network, which can include computing device connected to the distributed devices via a public network or the distributed devices themselves (which generate and distribute the new ledger entries), store local copies of the transaction ledger and determine an authoritative version of the transaction ledger based on predetermined consensus criteria. The validation network validates the transaction information based on the transaction ledger itself or encrypted identification information included in the transaction information for the distributed devices that generated the transaction information. The validation network further generates the new ledger entries based on a predetermined proof-of-work and/or proof-of-stake process. The distributed devices perform automation functions of the building management system based on the transaction ledger.

In general, according to another aspect, the invention features a building management system comprising distributed devices and a validation network. The distributed devices perform automation functions of the building management system and generate transaction information, and the validation network receives the transaction information, generates new ledger entries for a transaction ledger based on the transaction information, and distributes the new ledger entries.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1A:
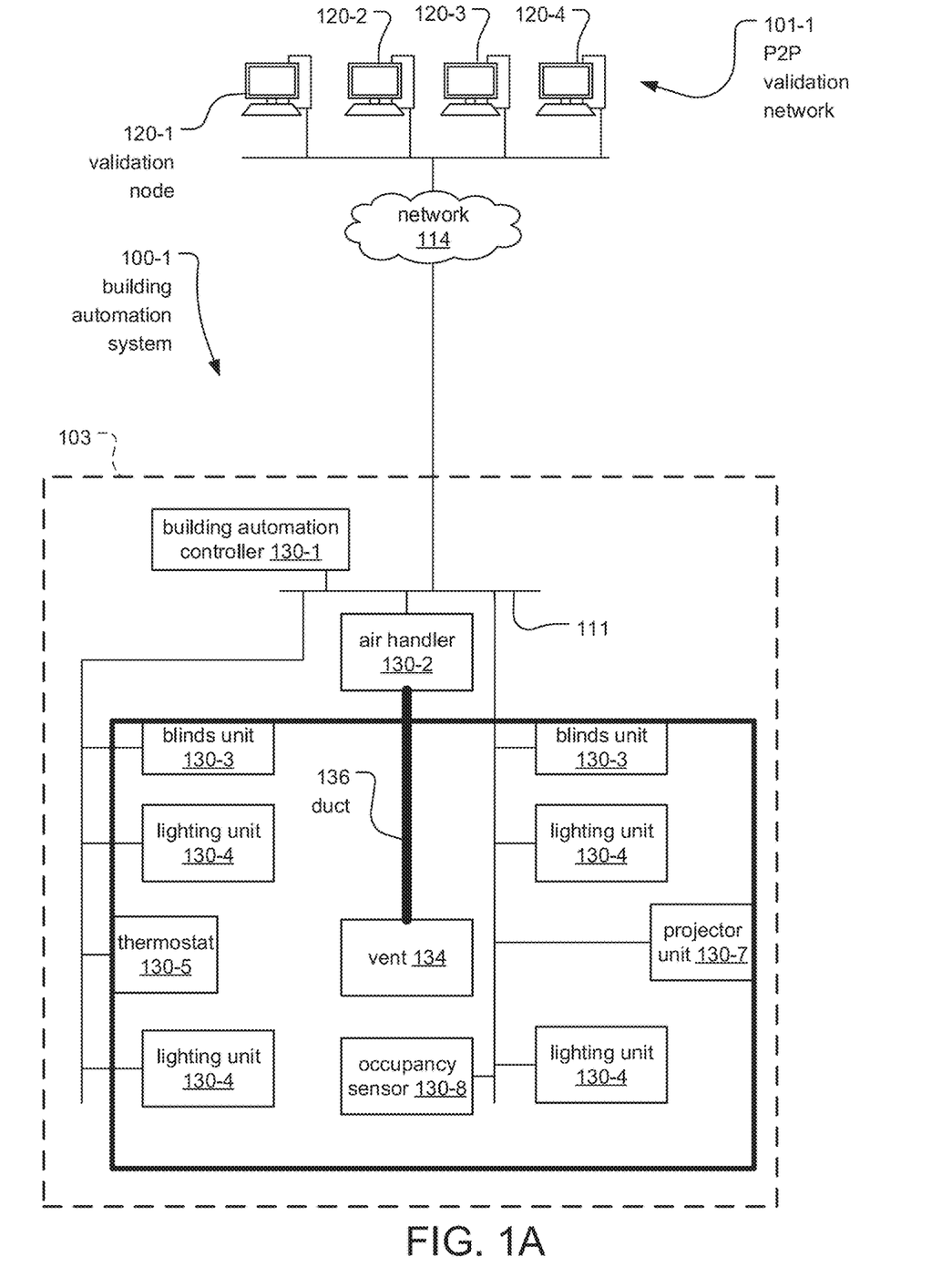
FIG. 1A is a schematic diagram of a building automation system, according to an embodiment of the present invention in which dedicated validation nodes of a validation network maintain a transaction ledger for the building automation system.

FIG. 1A is a schematic diagram of a building management system 100, according to an embodiment of the present invention.

The building management system 100 is installed at a premises such as a building 103 (e.g. office, hospital, warehouse, retail establishment, shopping mall, school, multi-unit dwelling, government building, or casino) and controls and monitors various equipment and conditions throughout the building 103.

In general, the building management system 100 includes a series of distributed devices 130 connected to a peer-to-peer validation network 101. The distributed devices 130 generate transaction information during normal operation of the building management system 100. The transaction information can include status information including status changes related to building management events, historical status and event information, authorization information (e.g. information about which devices are authorized to store and retrieve transaction information or perform particular building management functions), configuration information, and/or instructions for distributed devices 130, among other examples. The distributed devices 130 broadcast the transaction information to the validation network 101. The validation network 101 maintains a distributed transaction ledger (e.g. a blockchain) for the building management system 100, for example, by validating the transaction information and distributing the transaction information across the validation network according to consensus criteria to be stored locally in multiple instances by nodes of the validation network. The validation network 101 can be a publicly accessible distributed ledger such as a public blockchain, or it can be privately administered, with access restricted to only authorized validation nodes 120 and/or distributed devices 130.

The distributed devices 130 are positioned throughout the building 103 and perform the management and/or automation functions of the building management system 100. These devices might function as controllers or control panels, sensors, user interface elements, and/or actuators, among other examples. Of these, the sensors detect environmental conditions of the building 103 and send sensor data to be used by the controllers. The user interface elements present information to occupants of the building 103 and receive user input (e.g. via touchscreen displays). The actuators effect changes throughout the building 103 in order to, for example, control the environmental conditions or building equipment. The controllers direct the functionality of the respective building management systems 100 by receiving signals and/or sensor data (for example, from other distributed devices 130 such as the sensors or user interface elements), and generating and sending status information and/or instructions, among other examples, to other distributed devices 130 (for example, to the actuators and/or the user interface elements). Some distributed devices 130 (e.g. thermostats 130-5) combine functionality of controllers, sensors, user interface elements and actuators in one device. Additionally, the distributed devices 130 access transaction information stored on the distributed transaction ledger and perform the building management functions based on the transaction information.

The distributed devices 130 of building management systems 100 communicate with each other via a safety and automation network 111 of the building 103. These safety and automation networks 111 support digital and/or analog communication between the distributed devices 130. In some embodiments (not illustrated), the distributed devices 130 from multiple different building management systems 100 could all be connected to the same safety and automation network 111. The distributed devices 130 are also connected to the validation network via the safety and automation network 111 and/or a public and/or private network 114, which can be a leased data connection, a private network built for a specific enterprise client and/or a public network 114 such as the internet, in examples.

More specifically, in the illustrated example, the building management system 100 is a building automation system 100-1, which controls and monitors physical plant aspects of the building 103 and aspects of business-specific electrical, computer, and mechanical systems. The building automation system 100-1 includes a building automation controller 130-1, which is connected via the safety and automation network 111 to the other building automation distributed devices 130, including an air handler 130-2, a projector unit 130-7, blinds units 130-3, lighting units 130-4, a thermostat 130-5, and an occupancy sensor 130-8. The air handler 130-2 heats, cools and/or circulates air throughout the building 103 via ducts 136 and vents 134. The projector unit 130-7 raises or lowers a projector screen. The blinds units 130-3 control window coverings such as blinds by, for example, raising, lowering, opening, closing and/or controlling other physical mechanisms for adjusting the amount of light allowed to pass through the window. Lighting units 130-4 control illumination (e.g. of an indoor space), for example, via lighting mechanisms such as light bulbs. The thermostat 130-5 generates sensor data indicating climate conditions for particular areas of the building 103 (e.g. via temperature, humidity, and/or other sensors), displays or otherwise indicates status information, receives input indicating climate preferences (e.g. via a touchscreen display or other user interface), and controls the climate conditions by sending the sensor data to the building automation controller 130-1 and/or sending instructions to the air handler 130-2 based on the sensor data.

Additionally, the building automation system 100-1 is connected to an off-site (e.g. located outside the building 103) validation network 101-1 via the public and/or private network 114. The validation network 101-1 comprises a series of validation nodes 120, which generally are computing devices comprising central processing units executing processes for maintaining the distributed transaction ledger and nonvolatile memory for storing local copies of the transaction ledger.

The transaction information stored on the transaction ledger for the building automation system 100-1 might include status information including status changes for the distributed devices 130 and/or the system as a whole (such as whether areas of the building 103 are being heated or cooled), instructions sent from the building automation controllers 130-1 and thermostats 130-5 to other distributed devices 130, temperature setpoints for areas of the building 103, user input information, configuration information and/or authorization information indicating which distributed devices 130 and/or validation nodes 120 are authorized to access the distributed ledger. The transaction information also includes time and date information. In this way, the distributed ledger for the building automation system 100-1 includes an immutable log of, for example, building automation events and historical configuration information, which are added to the ledger in real time and can be accessed by the distributed devices 130 and/or technicians.

Figure 1B:
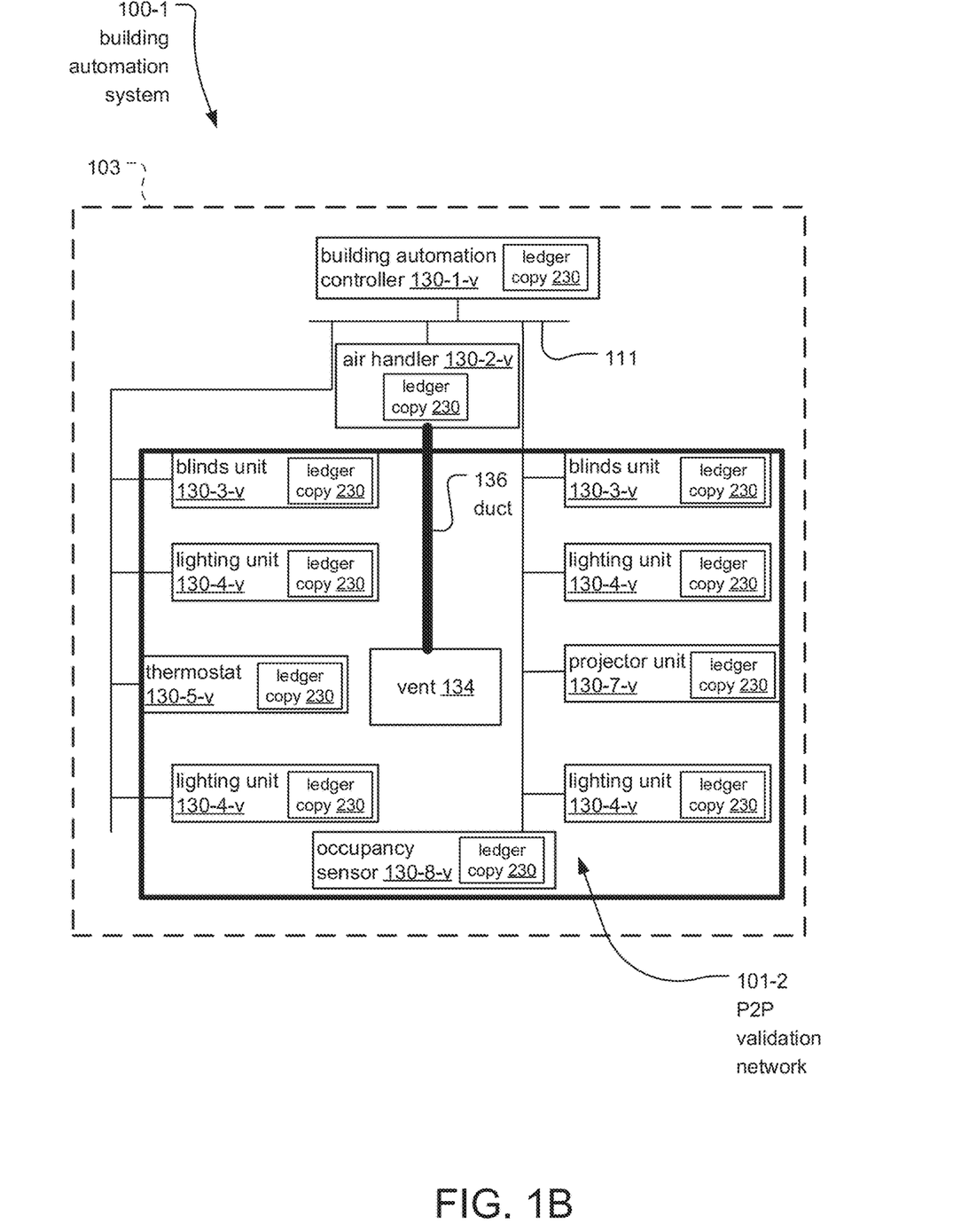
FIG. 1B is a schematic diagram of the building automation system, according to another embodiment of the present invention in which validator distributed devices of the validation network maintain the transaction ledger.

FIG. 1B is a schematic diagram of the building automation system 100-1, according to another embodiment of the present invention in which the validation network 101-2 is integrated into the building automation system 100-1. Now, the building automation system 100-1 includes validator distributed devices 130-v, which perform the functions associated with validating the transaction information and maintaining the distributed ledger in addition to the previously described building automation functions. In this embodiment, the distributed devices 130-v form the peer-to-peer validation network 101-2 and broadcast generated transaction information to other distributed devices 130-v to be validated, distributed and added to the distributed ledger. The distributed devices 130-v also store local copies of the transaction ledger 230.

Figure 1C:
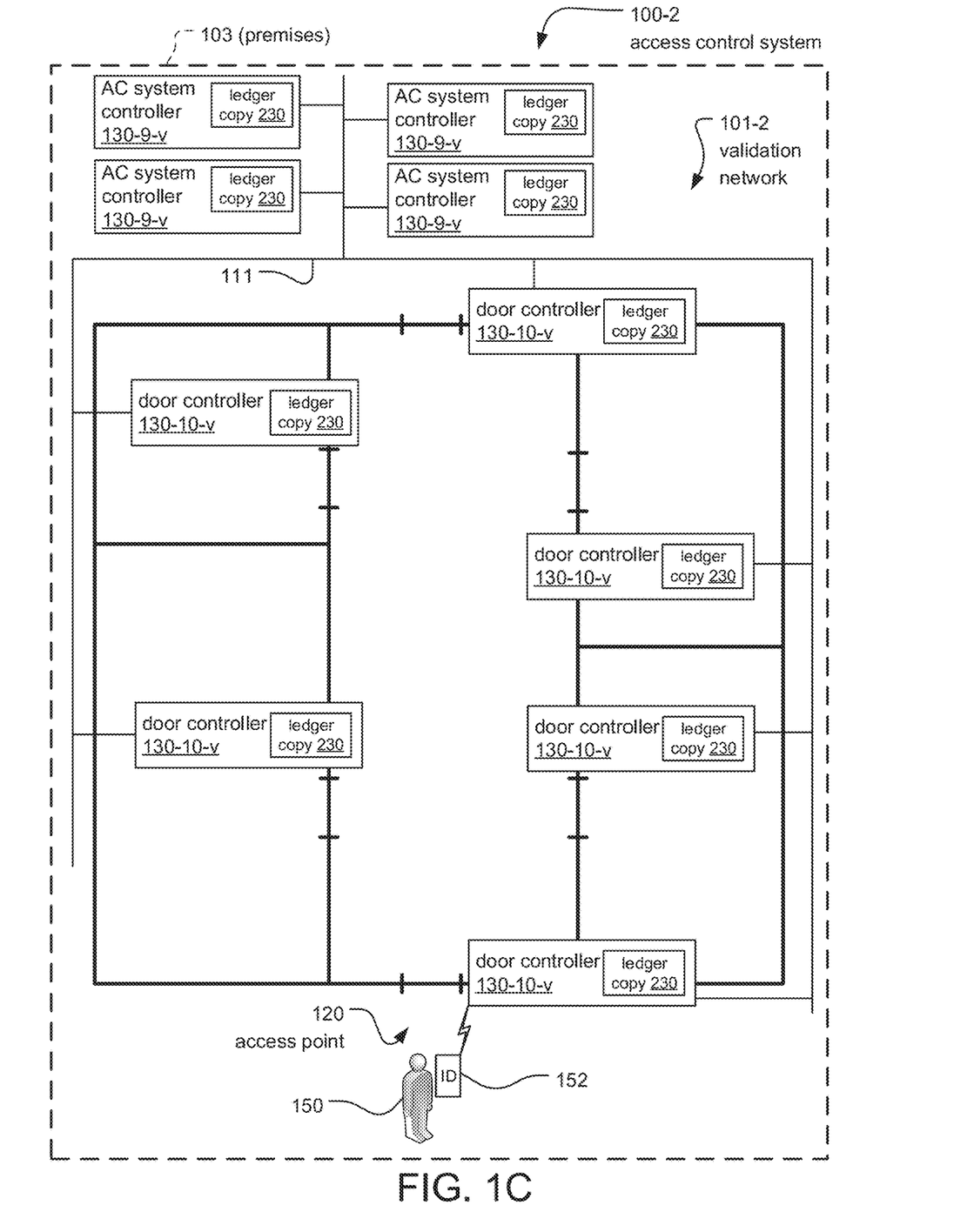
FIG. 1C is a schematic diagram of an access control system according to an embodiment of the present invention.

FIG. 1C is a schematic diagram of the building management system 100, according to another embodiment of the present invention in which the building management system 100 is specifically an access control system 100-2.

In general, the access control system 100-2 controls access through access points 120 (e.g. doors, elevators) to restricted areas of the building 103. The access control system 100-2 includes one or more access control system controllers 130-9, which are connected via the safety and automation network 111 to access control distributed devices 130, including, for example, door controllers 130-9 with access control readers for receiving input from occupants 150 of the building 103 seeking access through the access points 120 to the restricted areas. The door controller 130-9 verifies the input by, for example, confirming that the occupant who entered the input is authorized to access the access point 120 based on authorization information, which might include a list of users authorized to enter restricted areas, and controls access through the access point 120 (e.g. by unlocking a door via a door strike). In one example, the access control reader includes a wireless receiver, which receives identification information broadcast or otherwise transmitted by mobile computing devices, identification badges 152, and/or beacon devices of the occupants 150, among other examples.

In the illustrated example, the access control system 100-2 includes an integrated validation network 101-2 as in the system depicted in FIG. 1B. Here, the validator distributed devices 130-v include access control system controllers 130-9-v and door controllers 130-10-v, which store and maintain local copies of the transaction ledger 230, generate and broadcast transaction information to the validation network 101-2, and perform their respective access control functions as previously described based on, for example, transaction information from the distributed ledger.

The transaction information stored on the transaction ledger for the access control system 100-2 might include status information including status changes for the distributed devices 130 and/or the system as a whole (such as whether access points 120 are locked or unlocked, or access control events indicating identification information and access point information for each time an access point 120 is engaged with by an occupant 150 and whether access was granted or denied), instructions sent from the access control system controllers 130-9 to other distributed devices 130, user authorization information indicating which occupants 150 are authorized to access different areas of the building 103 and which ID badges 152 are associated with the users, user input information, configuration information and/or device authorization information indicating which distributed devices 130 and/or validation nodes 120 are authorized to access the distributed ledger. The transaction information also includes time and date information. In this way, the distributed ledger for the access control system 100-1 includes a log of access control events and historical configuration information and user authorization information, which are permanently added to the ledger in real time and can be accessed by the distributed devices 130, technicians and/or security personnel.

Figure 1D:
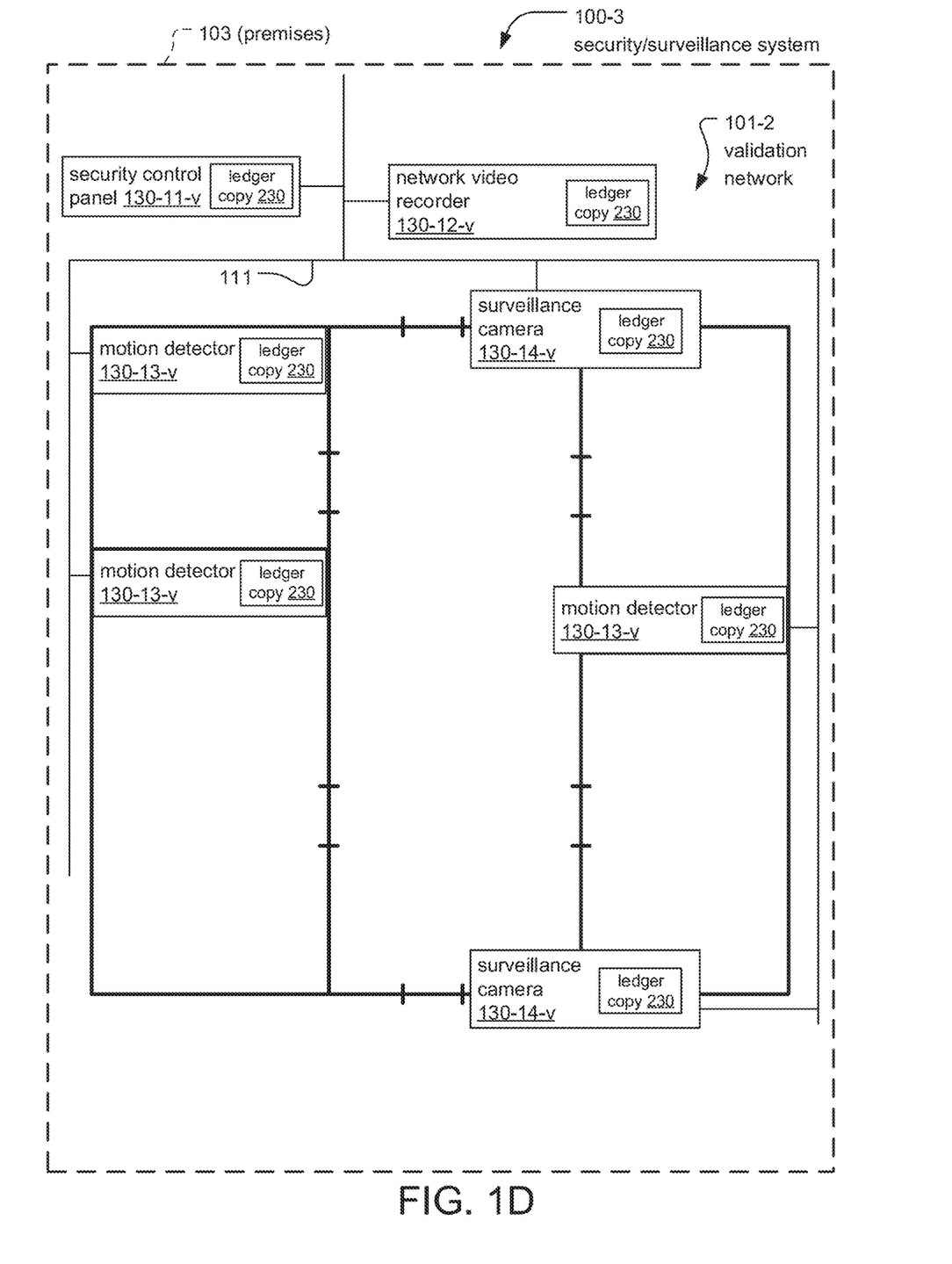
FIG. 1D is a schematic diagram of a security system according to an embodiment of the present invention.

FIG. 1D is a schematic diagram of the building management system 100, according to another embodiment of the present invention in which the building management system 100 is specifically a security system 100-3.

In general, the security system 100-3 detects indications of intrusions, building security breaches and unauthorized access at or within the building 103 and alerts managers and/or occupants of the building 103 and provides video surveillance of the building 103. The security system 100-3 includes a security control panel 130-11, which is connected via the safety and automation network 111 to security system distributed devices 130, including, for example, surveillance cameras 130-14, motion detectors 130-13, and network video recorders 130-12. The surveillance camera 130-14 captures image data depicting areas of the buildings, which is monitored, stored by the network video recorder 130-12, and/or analyzed, for example, via video analytics and facial recognition processes. The motion detectors 130-13 detect the presence of individuals in proximity, for example, and, in response, send signals to the security control panel 130-11. Other distributed security devices (not illustrated) include door and window relays or annunciators, among other examples.

In the illustrated example, the security system 100-2 includes an integrated validation network 101-2 as in the system depicted in FIG. 1B. Here, the validator distributed devices 130-v include a security control panel 130-11-v, a network video recorder 130-12-v, surveillance cameras 130-14-v, and motion detectors 130-13-v, which store and maintain local copies of the transaction ledger 230, generate and broadcast transaction information to the validation network 101-2, and perform their respective security functions as previously described based on, for example, transaction information from the distributed ledger.

The transaction information stored on the transaction ledger for the security system 100-3 might include status information including status changes for the distributed devices 130 and/or the system as a whole (such as whether the security system 100-3 is armed or unarmed, or security events indicating when intrusion was detected), instructions sent from the security system controllers 130-9 to other distributed devices 130, schedule information indicating when the system should be armed or unarmed, user input information, configuration information and/or device authorization information indicating which distributed devices 130 and/or validation nodes 120 are authorized to access the distributed ledger. The transaction information also includes time and date information. In this way, the distributed ledger for the security system 100-3 includes a log of security events and historical configuration information and schedule information, which are permanently added to the ledger in real time and can be accessed by the distributed devices 130, technicians and/or security personnel.

Figure 2:
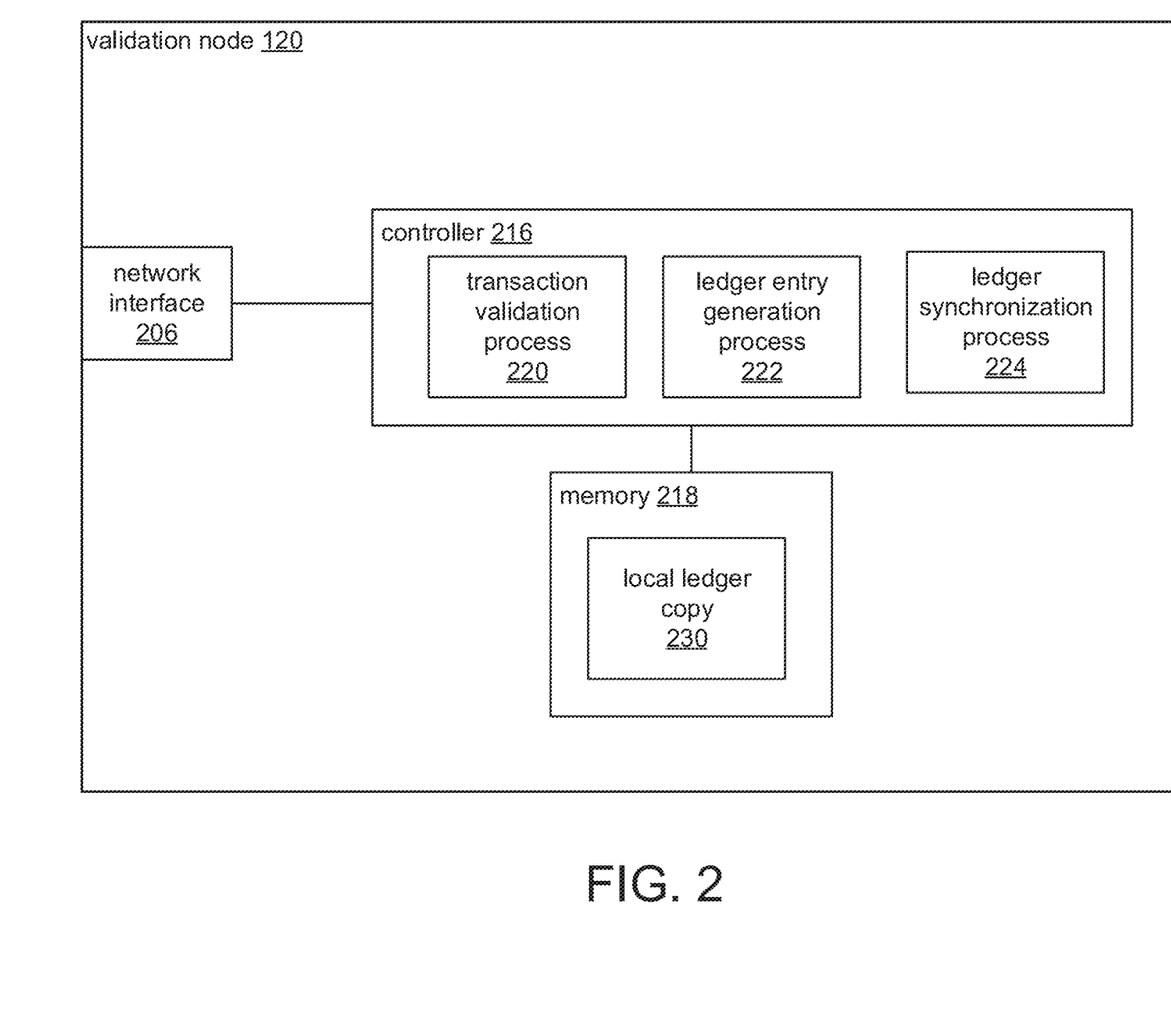
FIG. 2 is a schematic diagram of an exemplary validation node of the validation network.
Figure 3:
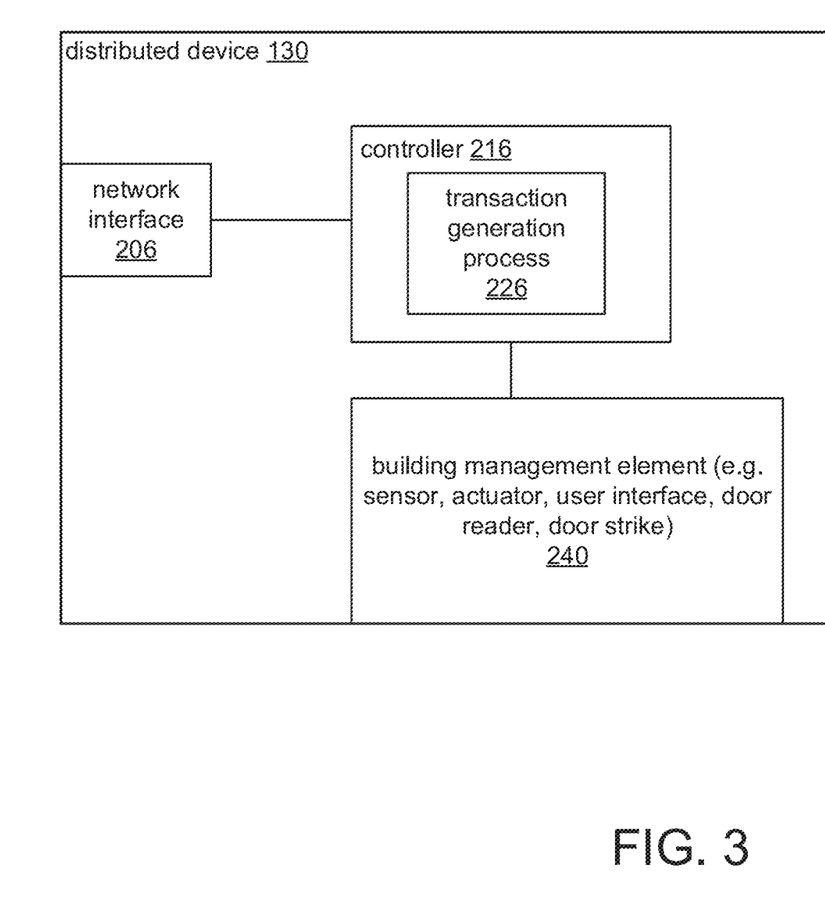
FIG. 3 is a schematic diagram of an exemplary distributed device of a generic building management system.
Figure 4:
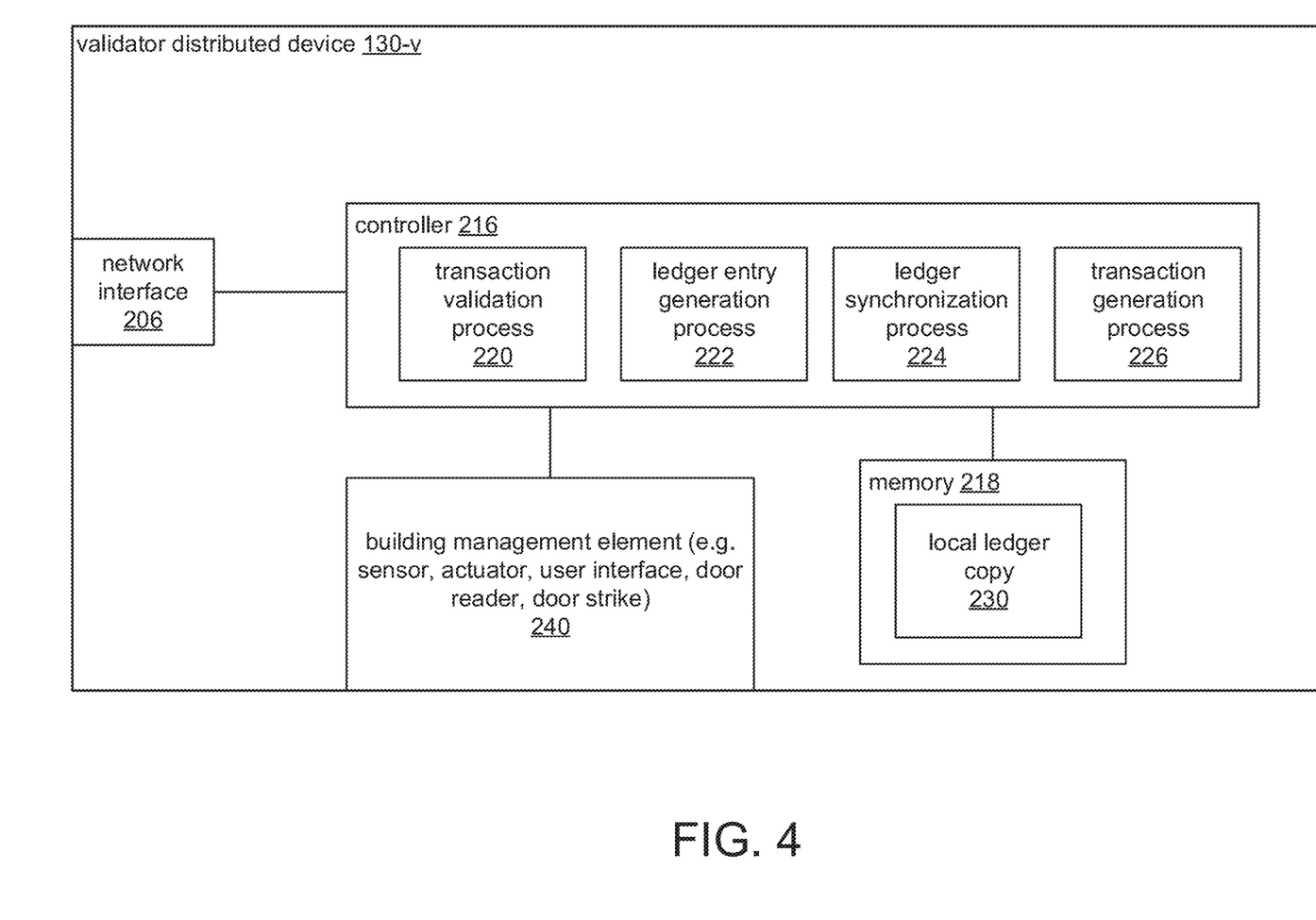
FIG. 4 is a schematic diagram of an exemplary validator distributed device of the building management system.

In general, FIGS. 2-4 are schematic diagrams of the devices of the building management system 100 that maintain the distributed transaction ledger and/or perform the building management functions. These include the validation node 120, the distributed device 130 and the validator distributed device 130. By way of review, the validation nodes 120 are part of the validation network 101-1 and are, for example, dedicated devices for maintaining the distributed ledger by receiving transaction information from the distributed devices 130, validating the transaction information, generating new ledger entries, synchronizing the ledger across the validation network 101-1, and storing local copies of the transaction ledger. The distributed devices 130 of the building management system 100 generate the transaction information during the normal course of performing building management functions of the building management system 100 and broadcast the transaction information to the validation network 101. The validator distributed devices 130-v are part of the validation network 101-2 and combine the functionality of the validation nodes 120 and the distributed devices 130 by, for example, both performing the building management functions and generating the transaction information as well as maintaining the distributed transaction ledger (by validating transaction information from other distributed devices 130, generating new ledger entries, etc.). In practice, the building management system 100 can include combinations of all three of these devices, and the validation network 101 can comprise both validator distributed devices 130-v and dedicated validation nodes 120.

Each of the previously referenced devices 120, 130, 130-v similarly includes a controller 216, and a network interface 206. Each device 120, 130, 130-v connects to the safety and automation network 111 and/or the public and/or private network 114 via the network interface 206, which can provide wired and/or wireless connections. The controller 216 executes firmware instructions along with particular processes for directing the functionality of the device and maintaining the distributed ledger. Additionally, the validation node 120 and the validator distributed device 130-v comprise nonvolatile memory 218 for storing local copies of the transaction ledger 230.

More specifically, FIG. 2 is a schematic diagram of an exemplary validation node 120 of the validation network 101-1, according to the embodiment depicted in FIG. 1A. As previously mentioned, the validation node 120 includes the controller 216, the network interface 206, and the nonvolatile memory 218.

Executing on the controller 216 of the validation node 120 is a transaction validation process 220, a ledger entry generation process 222 and a ledger synchronization process 224.

The transaction validation process 220 validates the transaction information from the distributed devices 130 (e.g. by confirming, based on the transaction ledger, that the distributed device 130 that generated the transaction information was authorized to post to the ledger, among other examples).

The ledger entry generation process 222 generates a new entry for the ledger (e.g. a new block in a blockchain) based on the transaction information. In one example, the new entry is generated based on a predetermined proof-of-work process (e.g. appending a random number to the end of the block until a hash of the block meets predefined criteria), or alternatively, based on a proof-of-stake process.

The ledger synchronization process 224 validates incoming new ledger entries and adds them to the local ledger copy 230 and also determines which version of the local ledger copy 230 is authoritative based on predetermined consensus criteria (such as a scoring process for new blockchains to determine the longest chain, for example).

FIG. 3 is a schematic diagram of an exemplary distributed device 130 of the building management system 100, according to the embodiment depicted in FIG. 1A. As previously mentioned, the distributed device 130 includes the controller 216 and the network interface 206.

Additionally, the distributed device 130 includes a building management element 240. The building management element 240 is, generally, a mechanism for performing building management functions of the building management system 100. The building management element can include sensors (e.g. temperature and humidity sensors, motion sensors, and/or cameras for capturing image data), actuators (e.g. components for opening or closing blinds, lowering projector screens, controlling climate conditions, illuminating areas of the building 103, and/or locking or unlocking doors), and user interface elements (e.g. touchscreen displays, speakers, microphones, indicators, annunciators). In general, the controller 216 executes processes (not illustrated) for directing the functionality of the building management element 240.

Executing on the controller 216 of the distributed device 130 is a transaction generation process 226, which generates the transaction information (e.g. based on status changes or other events occurring during the normal operation of the distributed device 130). In one example, the transaction generation process 226 compiles the relevant transaction data (including time and date information) and translates the data into a predetermined format associated with the transaction ledger.

FIG. 4 is a schematic diagram of an exemplary validator distributed device 130-v of the building management system 100, according to the embodiments depicted in FIGS. 1B through 1D. The validator distributed device 130-v includes the controller 216, nonvolatile memory 218, network interface 206, and building management element 240. Additionally, executing on the controller are the transaction validation process 220, the ledger entry generation process 222, the ledger synchronization process 224, and the transaction generation process 226.

Figure 5:
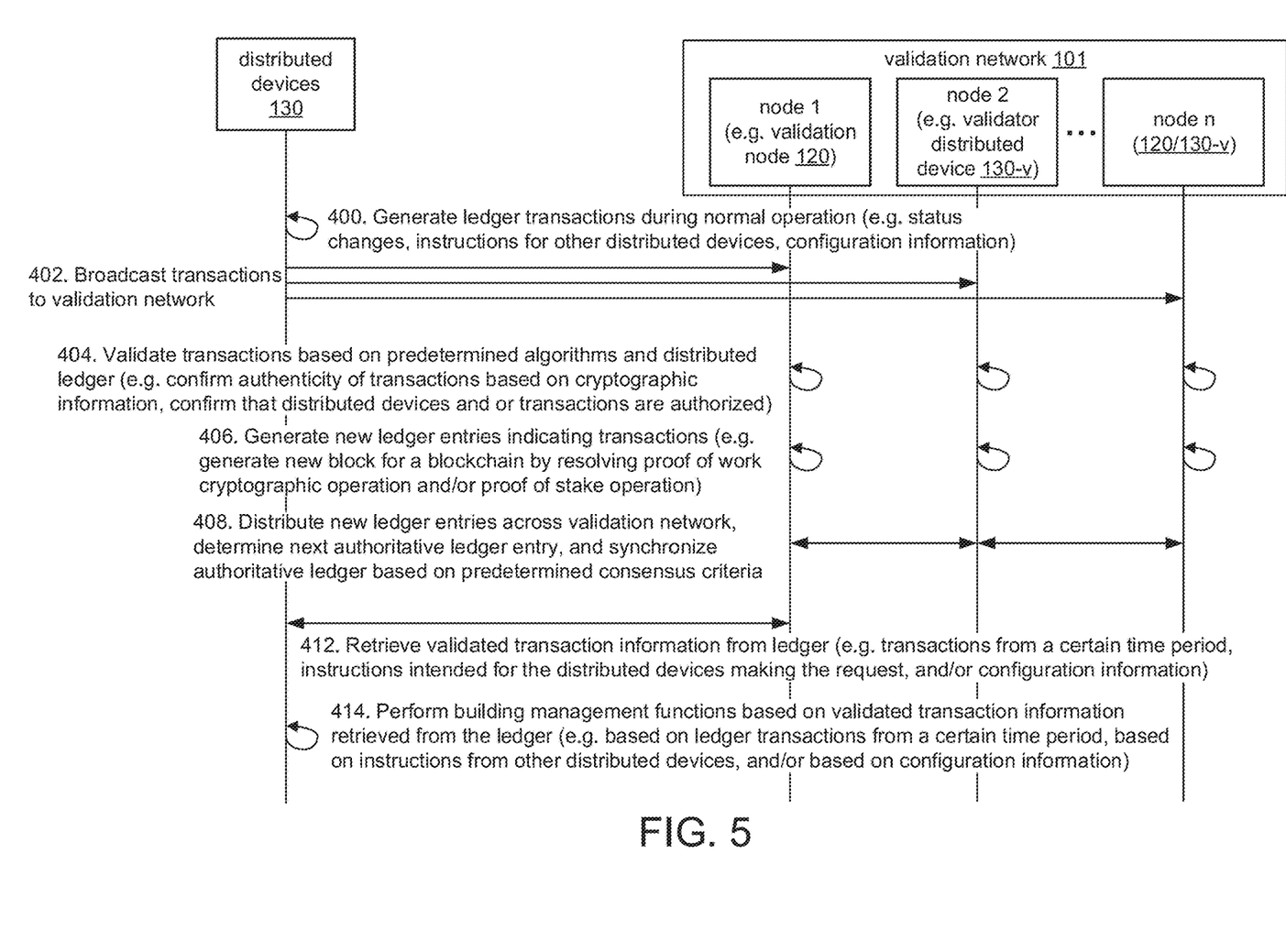
FIG. 5 is a sequence diagram illustrating the process by which the distributed devices and validation network of the building management system maintain and utilize the transaction ledger.

FIG. 5 is a sequence diagram illustrating the process by which the distributed devices 130 and validation network 101 maintain and utilize the distributed transaction ledger.

First, in step 400, the distributed devices 130 (including the validator distributed devices 130-v) generate ledger transactions via the transaction generation process 226 during the normal operation of the building management system 100. The transactions might include status changes, instructions for other distributed devices 130 and/or configuration information, among other examples.

In step 402, the distributed devices 130 broadcast the transaction information generated in step 400 to the validation network 101. In different examples, the distributed devices 130 can send the transaction information to one or more validation nodes 120, which then distribute the transaction information to other validation nodes 120 via the peer-to-peer validation network 101, or the distributed device 130 can send the transaction information to one or more validator distributed devices 130-v, or to a combination of validation nodes 120 and validator distributed devices 130-v.

In step 404, the validation network 101, via the transaction validation process 220 executing on the validation nodes 120 and/or validator distributed devices 130-v, validates the transactions based on predetermined algorithms and, for example, the local copy of the transaction ledger 230 accessible to the validation nodes 120 and/or validator distributed devices 130-v performing the validation. In different examples, different validation nodes 120 and or validator distributed devices 130-v can validate transactions from the same distributed device 130 simultaneously or from different distributed devices 130. In the former example, subsequent ledger entry generation and synchronization processes ensure that transaction information is not duplicated on the transaction ledger.

In step 406, the validation network 101, via the ledger entry generation process 222 executing on the validation nodes 120 and/or validator distributed devices 130-v, generate new ledger entries indicating the transaction information. In one example, the validation nodes 120 and/or validator distributed devices 130-v collect a series of transactions and then generate a block (e.g. for a blockchain) including the transactions. In different examples, the block is generated by resolving a proof of work cryptographic operation or a proof of stake operation.

In step 408, the validation network 101, via the ledger synchronization process 224 executing on the validation nodes 120 and/or validator distributed devices 130-v, distributes the new ledger entries across the validation network 101, determines the next authoritative ledger entry, and synchronizes the authoritative ledger based on predetermined consensus criteria. The validation network 101 determines and synchronizes the authoritative ledger entry, for example, based on a process of evaluating versions of the local ledger copies 230 with respect to each other using scoring and/or consensus criteria and selecting the more authoritative version, the result of which is the widespread adoption of a single authoritative version of the transaction ledger across the validation network 101.

In step 412, during normal operation of the building management system 100, the distributed devices 130 (including the validator distributed devices 130-v) retrieve validated transaction information from the transaction ledger. The validated transaction information might be retrieved by validator distributed devices 130-v accessing local copies of the transaction ledger 230 in nonvolatile memory 218, or, for example, by the distributed devices 130 submitting queries for information from the validation network 101. The validated transaction information retrieved by the distributed devices 130 includes transactions from a certain time period, instructions intended for the distributed devices 130 retrieving the information, and/or general configuration information, among other examples.

In step 414, the distributed devices 130 (including the validator distributed devices 130-v) then perform building management functions via the building management elements 240 based on the validated transaction information retrieved from the transaction ledger.

Figure 6:
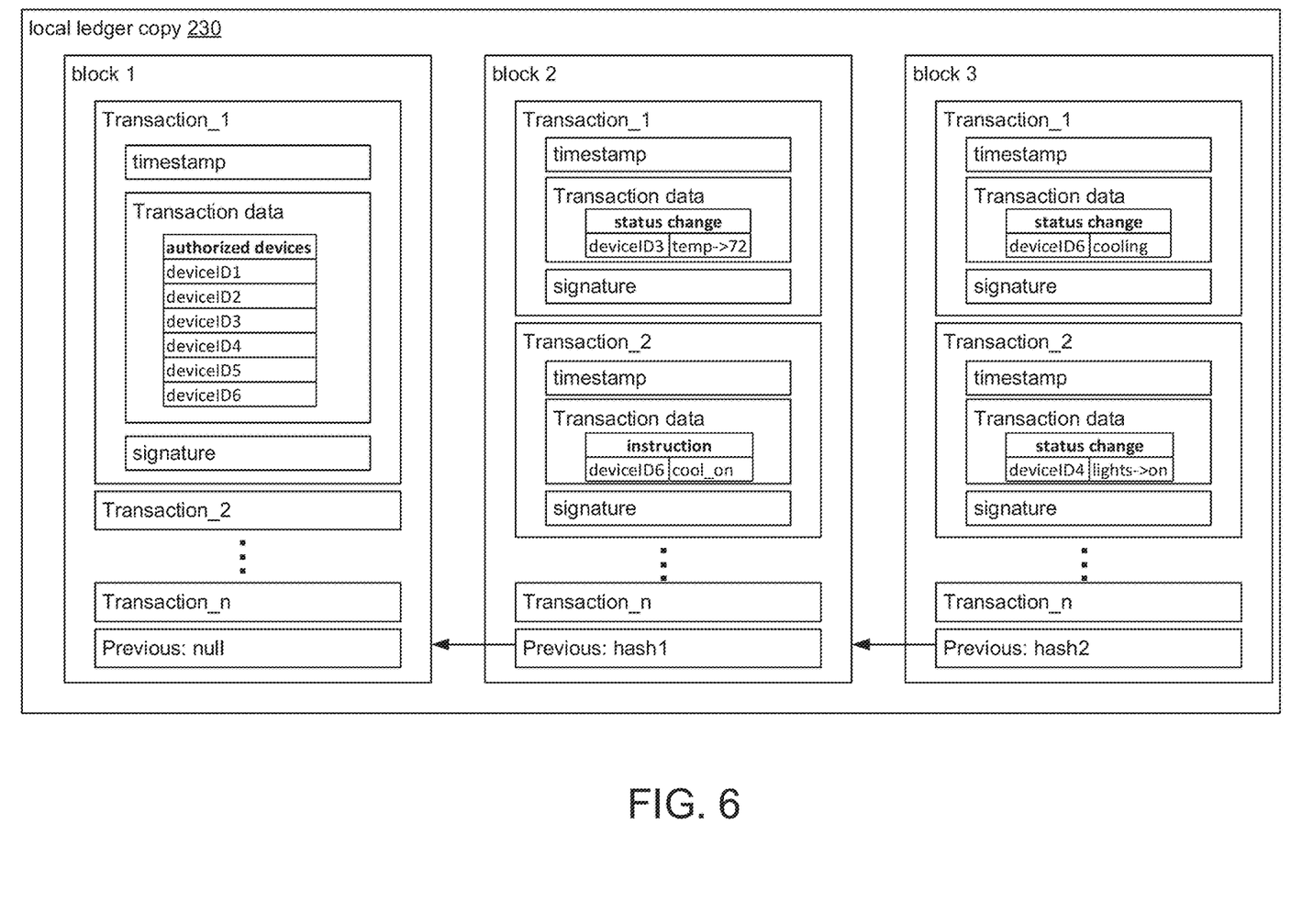
FIG. 6 is a schematic diagram illustrating an exemplary transaction ledger for the building management system.

FIG. 6 is a schematic diagram illustrating an exemplary transaction ledger for the building management system 100, specifically for the building automation system 100-1.

In the illustrated example, the transaction ledger is a blockchain, in which each ledger entry (or block) in a sequence of ledger entries contains a cryptographic hash of a preceding block along with the transaction information. The blockchain includes three ledger entries, block 1, block 2, and block 3. Block 1, being the original block, refers to "null" as the preceding block. Block 2 includes "hash1," which is a cryptographic hash of the entire contents of block 1, based on a predetermined cryptographic hash function. Similarly, block 3 includes "hash2," which is a cryptographic hash of the entire contents of block 2. In this way, the blocks form a chain, with each subsequent block referring to the preceding block.

Each of blocks 1, 2 and 3 comprise multiple transactions (Transaction_1, Transaction_2, . . . , Transaction_n). Each of the transactions includes a timestamp indicating date and time information associated with the transaction, transaction data, and a signature, which is generated upon validation of the transaction data (for example, via the transaction validation process 220).

For example, Transaction_1 of block 1 includes transaction data indicating a list of devices (deviceID1 through deviceID6) which might be used to validate whether transactions are from a predetermined set of devices authorized to post to the transaction ledger. Transaction_1 of block 2 includes transaction data indicating a status change for deviceID3 (e.g. a thermostat), namely a change of the temperature setpoint to 72 degrees. Transaction_2 of block 2 includes transaction data indicating a instructions for deviceID6 (e.g. an air handler) to initiate cooling (for example, generated and posted to the transaction ledger by a building automation controller 130-1 in response to the change of the temperature setpoint posted by deviceID3). Transaction_1 of block 3 includes transaction data indicating a status change for deviceID6, namely that the device is now cooling as instructed. Finally, Transaction_2 of block 3 includes transaction data indicating a status change for deviceID4, namely that the device has turned lights on.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of operation of a building management system of a building, the method comprising:
   distributed devices positioned throughout the building performing automation functions of the building management system and generating transaction information based on status changes or events occurring during normal operation of the distributed devices by compiling relevant data for the status changes or events with time and date information and translating the data into a predefined format associated with a transaction ledger;
   a validation network receiving the transaction information, generating new ledger entries for the transaction ledger based on the transaction information, and distributing the new ledger entries, wherein the validation network is in communication with the building management system and includes nodes that validate the transaction information and determine an authoritative version of the transaction ledger based on predetermined consensus criteria;
   the distributed devices performing the automation functions of the building management system based on the authoritative version of the transaction ledger by accessing validated transaction information stored on the transaction ledger and performing the automation functions based on the building automation functions being scheduled within the accessed validated transaction information via building management elements of the distributed devices; and
   nodes of the validation network storing local copies of the transaction ledger and determining an authoritative version of the transaction ledger based on predetermined consensus criteria, wherein the predetermined consensus criteria includes a scoring process for determining a longest chain among new blockchains, and the validation network evaluates and scores versions of the local copies of the transaction ledger with respect to each other to determine the authoritative version of the transaction ledger and selects the authoritative version of the transaction ledger, resulting in adoption of the authoritative version of the transaction ledger across the validation network.

2. The method as claimed in claim 1, wherein the distributed transaction ledger is a blockchain.

3. The method as claimed in claim 1, wherein the nodes are computing devices connected to the distributed devices via a public network.

4. The method as claimed in claim 1, further comprising the validation network validating the transaction information based on encrypted identification information included in the transaction information for the distributed devices that generated the transaction information.

5. The method as claimed in claim 1, further comprising the validation network validating the transaction information based on the transaction ledger.

6. The method as claimed in claim 1, further comprising the validation network generating the new ledger entries based on a predetermined proof-of-work and/or proof-of-stake process.

7. A building management system of a building, the building management system comprising:
  distributed devices positioned throughout the building for performing automation functions of the building management system and generating transaction information based on status changes or events occurring during normal operation of the distributed devices by compiling relevant data for the status changes or events with time and date information; and
  translating the data into a predefined format associated with a transaction ledger; and
  a validation network for receiving the transaction information, generating new ledger entries for the transaction ledger based on the transaction information, and distributing the new ledger entries, wherein the validation network is in communication with the building management system and includes nodes that validate the transaction information and determine an authoritative version of the transaction ledger based on predetermined consensus criteria;
  wherein the distributed devices perform the automation functions of the building management system based on the authoritative version of the transaction ledger by accessing validated transaction information stored on the transaction ledger and perform the building automation functions based on the building automation functions being requested within the accessed validated transaction information via building management elements of the distributed devices, and the transaction information generated by the distributed devices and stored on the transaction ledger includes temperature setpoints for areas of the building, and wherein the distributed transaction ledger is a blockchain;
  wherein the system further comprises nodes of the validation network configured to store local copies of the transaction ledger and determine an authoritative version of the transaction ledger based on predetermined consensus criteria, wherein the predetermined consensus criteria includes a scoring process for determining a longest chain among new blockchains, and the validation network evaluates and scores versions of the local copies of the transaction ledger with respect to each other to determine the authoritative version of the transaction ledger and selects the authoritative version of the transaction ledger, resulting in adoption of the authoritative version of the transaction ledger across the validation network.

8. The system as claimed in claim 7, wherein the nodes are computing devices connected to the distributed devices via a public network.

9. The system as claimed in claim 7, wherein the validation network validates the transaction information based on encrypted identification information included in the transaction information for the distributed devices that generated the transaction information.

10. The system as claimed in claim 7, wherein the validation network validates the transaction information based on the transaction ledger.

11. The system as claimed in claim 7, wherein the validation network generates the new ledger entries based on a predetermined proof-of-work and/or proof-of-stake process.

12. The method as claimed in claim 1, wherein the transaction information generated by the distributed devices and stored on the transaction ledger includes status information including status changes related to building management events, historical status and event information, authorization information including information about which devices are authorized to store and retrieve the transaction information or perform particular building management functions, configuration information, and/or instructions for the distributed devices.

13. The method as claimed in claim 1, wherein the building management elements of the distributed devices include sensors, actuators, and/or user interface elements.

14. The method as claimed in claim 1, wherein the validation network includes a publicly accessible distributed ledger.

15. The method as claimed in claim 1, wherein the validation network is privately administered, with access restricted to only authorized validation nodes and distributed devices.

16. The method as claimed in claim 1, wherein the transaction ledger includes a log of building management events and historical configuration information, which are permanently added to the ledger in real time and can be accessed by the distributed devices, technicians, and/or security personnel.

17. The method as claimed in claim 1, wherein the building management system is a building automation system, and the transaction information generated by the distributed devices and stored on the transaction ledger includes information about whether areas of the building are being heated or cooled, instructions from building automation controllers and thermostats to other distributed devices, and the temperature setpoints for the areas of the building.

18. The method as claimed in claim 1, wherein the building management system is an access control system, and the transaction information generated by the distributed devices and stored on the transaction ledger includes information about whether access points are locked or unlocked, access control events indicating identification information and access point information for each time an access point is engaged with by an occupant and whether access was granted or denied, instructions sent from access control system controllers to other distributed devices, and user authorization information indicating which occupants are authorized to access different areas of the building and which identification badges are associated with the occupants.

19. The method as claimed in claim 1, wherein the building management system is a security system, and the transaction information generated by the distributed devices and stored on the transaction ledger includes information about whether the security system is armed or unarmed, security events indicating when intrusion was detected, instructions sent from security system controllers to other distributed devices, and schedule information indicating when the security system should be armed or unarmed.

20. The method as claimed in claim 5, further comprising the transaction ledger including a ledger entry with transaction data indicating a predetermined set of devices authorized to post to the transaction ledger and the validation network validating the transaction information from the distributed devices by confirming, based on the transaction ledger, that the distributed devices that generated the transaction information were authorized to post to the transaction ledger.

21. The method as claimed in claim 5, wherein each of the ledger entries of the transaction ledger includes a timestamp indicating date and time information associated with the transaction, transaction data, and a signature, which is generated upon validation of the transaction data.

22. The method as claimed in claim 1, wherein the predetermined consensus criteria includes a scoring process for determining a longest chain among new blockchains.

23. The method as claimed in claim 1, further comprising the validation network evaluating and scoring versions of local copies of the transaction ledger with respect to each other to determine the authoritative version of the transaction ledger and selecting the authoritative version of the transaction ledger, resulting in adoption of the authoritative version of the transaction ledger across the validation network.

24. The method as claimed in claim 1, wherein the transaction information accessed by the distributed devices includes transactions from a certain time period, instructions intended for the distributed devices accessing the transaction information, and/or configuration information.

25. The method as claimed in claim 1, wherein the validation network validates the transaction information based on the transaction ledger and encrypted identification information included in the transaction information for the distributed devices that generated the transaction information, the transaction ledger including a ledger entry with transaction data indicating a predetermined set of devices authorized to post to the transaction ledger and the validation network validating the transaction information from the distributed devices by confirming, based on the transaction ledger, that the distributed devices that generated the transaction information were authorized to post to the transaction ledger.

26. A method of operation of a building management system of a building, the method comprising:
- distributed devices positioned throughout the building performing automation functions of the building management system and generating transaction information based on status changes or events occurring during normal operation of the distributed devices by compiling relevant data for the status changes or events with time and date information and translating the data into a predefined format associated with a transaction ledger;
- a validation network receiving the transaction information, generating new ledger entries for the transaction ledger based on the transaction information, and distributing the new ledger entries, wherein the validation network is in communication with the building management system and includes nodes that validate the transaction information and determine an authoritative version of the transaction ledger based on predetermined consensus criteria; and
- the distributed devices performing the automation functions of the building management system based on the authoritative version of the transaction ledger by accessing validated transaction information stored on the transaction ledger and performing the automation functions based on the building automation functions being scheduled within the accessed validated transaction information via building management elements of the distributed devices; and
- wherein the validation network validates the transaction information based on the transaction ledger and encrypted identification information included in the transaction information for the distributed devices that generated the transaction information, the transaction ledger including a ledger entry with transaction data indicating a predetermined set of devices authorized to post to the transaction ledger and the validation network validating the transaction information from the distributed devices by confirming, based on the transaction ledger, that the distributed devices that generated the transaction information were authorized to post to the transaction ledger.

* * * * *